3,394,024
ANTIFOGGING CELLOPHANE

Daniel K. Owens, Bon Air, Va., assignor to E. I. du Pont de Nemours and Company, Wilmington, Del., a corporation of Delaware
No Drawing. Filed Apr. 8, 1965, Ser. No. 446,728
8 Claims. (Cl. 117—76)

ABSTRACT OF THE DISCLOSURE

A plastic film coated with an antifogging composition comprising a water-soluble salt of an alkaline earth metal and a hydrocarbon sulfate wetting agent.

---

This invention relates to plastic films and antifogging agents therefor.

In the development of transparent wrapping films for packaging a variety of products a number of requirements must be met. To be used successfully on automatic packaging machinery the film must have adequate slip and should be free of blocking tendencies and should be readily heat sealable so that packages can be readily formed. For the wrapping of foodstuffs which are of relatively high moisture content an additional requirement is that moisture from the packaged product should not deposit upon the interior surface of the film package in minute droplets or as a fog. This tendency of moisture to deposit in the form of a fog on the interior surface of the package reduces transparency and greatly interferes with the effective display of the particular packaged article.

One approach to this problem is to incorporate on the surface of the packaging film a small amount of a wetting agent in the form of a continuous uniform layer which functions to provide more effective wetting of the surface or spreading of the moisture on the surface in the form of a layer rather than in the form of small droplets or fog. A difficulty incurred in this approach is that when the wetting agent is applied to the surface in an amount sufficient to act as an effective antifog agent the heat sealability of the treated surface is adversely affected. Another difficulty lies in the fact that most wetting agents are not powerful enough to wet the film uniformly and the film exhibits fogging in patches. In some cases, combinations of different wetting agents have provided effective antifogging performance but an undesired side effect was a tendency for the film to block rather easily in addition to giving difficulty in heat sealing.

It is therefore an object of this invention to provide a film which is readily heat sealable, which has good slip and non-blocking properties, and which remains transparent and is non-fogging when in contact with moist atmospheres. A more specific object is to provide a vinylidene chloride coated regenerated cellulose film which is readily heat sealable, which has good slip and blocking properties, and which is non-fogging when used for the packaging of moist objects or articles. Other objects will appear from the description which follows.

According to the present invention, there is provided a useful coating composition comprising about 10 to 90 mol percent of a water-soluble nitrate, acetate, halide or sulfate salt of a Group II metal and about 90 to 10 mol percent of an alkali metal salt of an aliphatic hydrocarbon sulfate wherein the hydrocarbon group contains 8 through 18 carbon atoms.

This composition is applied in aqueous solution to the surface of a transparent heat sealable plastic film in an amount to provide per square meter of the film surface from about 1 to about 25 milligrams of the water-soluble salt and the alkali metal salt (total).

A convenient way of applying the improved antifog composition to the surface of a film is to pass the film through an aqueous solution of the composition and remove excess solution from the film by passing it through a set of squeeze rolls. The film is thereafter dried.

In the preferred embodiment of this invention the water-soluble metal salt and the alkali metal salt of the aliphatic hydrocarbon sulfate are employed in substantially equal molar quantities. A preferred alkali metal aliphatic hydrocarbon sulfate is sodium lauryl sulfate and a preferred water-soluble metal salt is magnesium sulfate. A preferred film is a vinylidene chloride copolymer coated regenerated cellulose film.

Although the antifog composition of this invention is especially useful for the after-sizing of vinylidene chloride copolymer coated regenerated cellulose films, and particularly for such coatings applied from a solvent system, these compositions can also be used for the sizing of films that have been coated with aqueous dispersions of vinylidene chloride copolymers and including such base films as regenerated cellulose as well as the various thermoplastic polyester base films such as those of polyethylene terephthalate, and polyolefin films such as polypropylene and polyethylene as well as various copolymer films of the polyolefins, polymers of the haloolefins such as polyvinyl chloride and polyvinyl fluoride. These antifog compositions can also be used on various films that are not coated such as melt extruded films of the polyolefins and the polyhaloolefins such as polyethylene, polypropylene, polyvinyl chloride, polyvinyl fluoride and polyester films such as those made from polyethylene terephthalate and various copolyesters of this general type.

With respect to the alkali metal aliphatic hydrocarbon sulfate, other alkali metals, lithium, potassium, rubidium and cesium can be used in place of sodium. Representative hydrocarbonyl radicals include octyl, decyl, dodecyl (lauryl), tetradecyl, hexadecyl and octadecyl as well as the corresponding olefinically unsaturated radicals and branched chain radicals.

In addition to the water-soluble salts, mentioned above, others that can be used include magnesium acetate, zinc acetate, magnesium bromide, calcium bromide, calcium acetate as well as corresponding salts of other Group II metals such as beryllium, strontium, cadmium, barium and mercury. It is important that the salt be water-soluble, having a solubility in water of at least 5% by weight at 25° C.

The primary advantage of this new sizing agent is that it provides a ready means for making heat sealable transparent films which will run well on automatic packaging machines and will remain transparent even in the presence of high moisture containing products such as food products which are packaged in transparent films. An added advantage is that a more uniform non-fogging characteristic can be realized at lower concentration levels for the wetting agent than has been here before possible. Thus, more effective antifogging characteristics are realized at lower cost which is most important in large scale commercial manufacturing operations.

This invention will be more clearly understood by reference to the following examples. These examples illustrate specific embodiments of the present invention and should not be construed to limit the invention in any way.

Example 1

A film was made by coating on a regenerated cellulose film a coating composition of a copolymer of 92 parts of vinylidene chloride, 2 parts of methyl methacrylate, 6 parts of acrylonitrile and 0.5 part of itaconic acid in a toluene/tetrahydrofuran coating solvent. The film was thereafter passed through an aqueous solution of essentially equal molar portions of magnesium sulfate and sodium lauryl sulfate (0.15% by weight sodium lauryl sulfate and 0.13% by weight $MgSO_4 \cdot 7H_2O$) and the film was thereafter dried. The dried film bearing approximately 3 milligrams of magnesium sulfate (anhydrous) and 7 milligrams of sodium lauryl sulfate per square meter of film surface had good film slip as indicated by a film to film coefficient of friction of 0.20 and film to metal coefficient of friction of 0.15 and the film showed no evidence of blocking. It was sealed to itself on a Simplex bag machine to give excellent heat seals at temperatures as low as 100° C.

A portion of the film was formed into a bag, a head of lettuce was inserted in the bag, and the opening was thereafter sealed and the package was refrigerated at 40° F. There was no indication of fogging on the interior of the bag.

In a control experiment a second sample of regenerated cellulose film having the same vinylidene chloride copolymer coating was passed through an aqueous solution containing only sodium lauryl sulfate (0.50% by weight) and there was produced a sized film bearing on the surface 16 milligrams per square meter of film surface. The film also had very good slip and was non-blocking but fogged in several discrete areas because of non-uniform wetting when submitted to a test similar to that described above wherein a wet product such as lettuce was packaged and then refrigerated. It was also found that this sized film did not heat seal well. Poor seals were obtained on the Simplex bag machine at temperatures as high as 130° C. and the films could be sealed in only a relatively narrow range.

In still another control experiment, another sample of the same coated film was drawn through an aqueous solution containing only magnesium sulfate. The solution did not wet the film and it emerged essentially dry. No magnesium sulfate could be detected on the film surface and it fogged badly in the aforementioned test with a moist product.

In a further set of control experiments sodium chloride and sodium sulfate were separately substituted for magnesium sulfate as in Example 1. These materials were not effective and fogging results paralleled those of the first control.

Example 2

Example 1 was repeated except that magnesium chloride was substituted for the magnesium sulfate of that example, with similarly satisfactory results.

Example 3

Example 1 was repeated except that magnesium nitrate was substituted for the magnesium sulfate of that example, with similarly satisfactory results.

Example 4

Example 1 was repeated except that calcium chloride was substituted for the magnesium sulfate of that example, with similarly satisfactory results.

Example 5

Example 1 was repeated except that calcium nitrate was substituted for the magnesium sulfate of that example, with similarly satisfactory results.

ADDITIONAL EXEMPLIFICATION

To practice this invention using other water-soluble salts, other alkali metal salts of aliphatic hydrocarbon sulfates, and/or other plastic films, merely substitute such materials for the corresponding materials of the foregoing examples.

The invention claimed is:

1. A transparent heat sealable plastic film having on at least one surface a coating composition consisting essentially of about 10 to 90 mol percent of a water-soluble salt selected from the group consisting of a nitrate, acetate, halide and sulfate of a Group II metal and about 90 to 10 mol perecnt of an alkali metal salt of an aliphatic hydrocarbon sulfate wherein the hydrocarbon group contains 8 through 18 carbon atoms, said coating being in an amount to provide per square meter of the film surface from about 1 to about 25 milligrams of said water-soluble salt and said alkali metal salt.

2. A film as in claim 1 wherein said water-soluble salt is magnesium sulfate.

3. A film as in claim 1 wherein said water-soluble salt is magnesium chloride.

4. A film as in claim 1 wherein said water-soluble salt is magnesium nitrate.

5. A film as in claim 1 wherein said water-soluble salt is calcium chloride.

6. A film as in claim 1 wherein said water-soluble salt is calcium nitrate.

7. A film as in claim 1 wherein said alkali metal salt is sodium lauryl sulfate.

8. A film as in claim 1 wherein said film is a vinylidene chloride copolymer coated regenerated cellulose film.

References Cited

UNITED STATES PATENTS

| | | | |
|---|---|---|---|
| 2,434,683 | 1/1948 | Whitby et al. | 252—161 XR |
| 2,776,212 | 10/1956 | Grifo | 252—161 |
| 2,835,595 | 5/1958 | Salatiello | 99—174 |
| 3,222,191 | 12/1965 | Steiner et al. | 99—174 |

JAMES A. SEIDLECK, *Primary Examiner.*

L. HAYES, *Assistant Examiner.*